United States Patent [19]
Clapp

[11] Patent Number: 4,896,187
[45] Date of Patent: Jan. 23, 1990

[54] HIGH-EFFICIENCY ILLUMINATING SYSTEM AND METHOD FOR MULTI-IMAGE PRINTERS

[76] Inventor: Roy A. Clapp, 2505 S. Kiwanis Ave., Sioux Falls, S. Dak. 57105

[21] Appl. No.: 233,725

[22] Filed: Aug. 19, 1988

[51] Int. Cl.$^4$ .................. G03B 27/54; G03B 27/44
[52] U.S. Cl. ........................................ 355/71; 355/77
[58] Field of Search ............... 355/40, 41, 46, 54, 355/67, 70, 71, 77

[56] References Cited

U.S. PATENT DOCUMENTS

| | | | |
|---|---|---|---|
| 2,135,074 | 11/1938 | Grant | 355/71 |
| 3,212,396 | 10/1965 | Schwardt et al. | 355/46 X |
| 3,488,117 | 1/1970 | Weisglass | 355/67 X |
| 3,649,121 | 3/1972 | Cohen | 355/54 X |
| 3,782,821 | 1/1974 | Bosman | 355/70 |
| 3,951,545 | 4/1976 | Lucht | 355/71 X |

FOREIGN PATENT DOCUMENTS 1048431 11/1966 United Kingdom ............... 355/71

Primary Examiner—Donald A. Griffin
Attorney, Agent, or Firm—Peterson, Wicks, Nemer & Kamrath

[57] ABSTRACT

My negative illuminating system involves the concentrating of light energy from one or more lamps to form a secondary light source of small area, then passing the light from the secondary light source through an optical system that magnifies the light from the small area source to an enlarged area of illumination sufficient in size to cover a photographic negative that is several times larger than the area of the secondary source. The light stream is also confined generally to the objective lens field of the various lens arrays that are individually inserted into the light stream making photographic prints of different sizes.

10 Claims, 3 Drawing Sheets

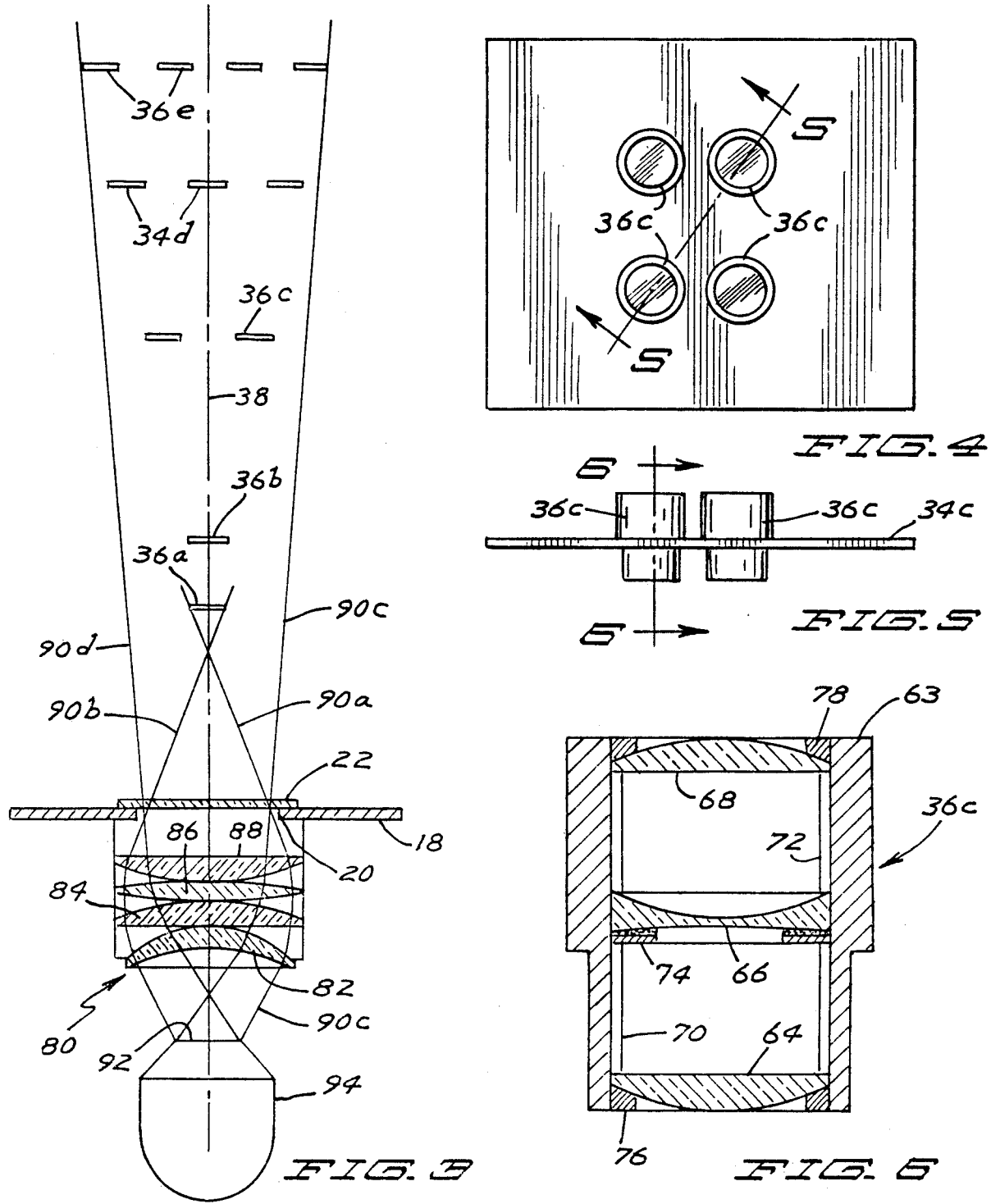

HIGH-EFFICIENCY ILLUMINATING SYSTEM AND METHOD FOR MULTI-IMAGE PRINTERS

BACKGROUND OF THE INVENTION

This invention relates generally to multi-image printers, and pertains more particularly to an optical system and method for use with such printers in which the light beam is confined within more useful boundaries for the various objective lenses used in producing the various size prints.

DESCRIPTION OF THE PRIOR ART

Multi-image printers as they are currently termed incorporate a number of different objective lenses, each lens serving to project an image of a single negative onto the sensitized paper. The various lenses are mounted on different lens boards in the form of arrays or clusters which may range from a single lens to sixteen or even more as far as a given lens board is concerned.

All of the lens boards and the lens arrays mounted thereon are normally stored at one side of a lens chamber, an individual board being selectively moved into its operating position at a prescribed location between the negative aperture and the photographically sensitized material which will produce the desired size of print or prints.

While the lens board is positioned in the light path, a shutter opens and then closes, thereby permitting a block of a desired number of prints to be exposed. Thereafter, the board is returned to the side of the lens chamber from which it has been taken and stored there until again needed. Another board is substituted therefor and the printing cycle successively repeated until the desired number of prints has been made. During the periods in which the lens boards are interchanged or substituted for each other, the exposed section of sensitized color paper is advanced so that a fresh section is provided for the next exposure.

It will be understood that the different lens boards on which a given number of objective lenses is mounted will occupy a variety of locations during a complete operating cycle. The required illumination must be such that direct light will pass through each and every point of the negative and likewise to each and every location where an objective lens has been located, doing so during each printing cycle.

Whereas a condenser lens system is highly efficient when employed with a single objective lens, such is not the case when a conventional condenser lens system is used in conjunction with a number of objective lenses having various location patterns of the objective lenses on the various lens boards, and, of course, due to the fact that the various lens boards must be shifted into the light stream at different longitudinally spaced locations along the optical axis. An example of a condenser lens system that would be satisfactory for a single objective lens system required in a multi-image printer, is described in U.S. Pat. No. 3,157,087, granted on Nov. 17, 1964 to Karl J. Kollenberg for "OPTICAL LIGHT DISTRIBUTION SYSTEM FOR A PHOTOGRAPHIC PROJECTION PRINTER."

Accordingly, the only practical solution in obtaining what has been referred to in the preceding paragraph has been to provide a fully diffused light source, doing so over an area somewhat larger than the negative, and locating the diffused light source a short distance beneath the negative. Because such light energy is scattered in all directions throughout a 180° hemisphere, very little of this energy has been usefully intercepted by the various objective lenses. Actually, some of the light has in the past been directed toward the operator's eyes so that a neutral density visor has been required in order to reduce the intensity of this unwanted glare. Consequently, in order to obtain acceptable exposure times, the lamp houses providing the fully diffused light have relied upon "brute force," using primary light sources of 1,000 watts or even more.

While the structure of prior art lamp houses has taken a variety of forms, such forms have all employed some kind of integrating chamber having a light emission opening covered with a diffuser of translucent plastic. The emission opening has to be larger than the negative aperture, and located closely beneath the negative aperture.

It can be further explained that the integrating chamber of the various lamp houses known to me is generally of two types: (1) an enclosure, sometimes of spherical form, internally coated with highly reflective matte white paint. The primary light energy in such prior art lamp houses has been injected through a number of small input ports from lamps situated exteriorly of the chamber, or (2) a tunnel having specular reflecting inner surfaces. In such cases, a plastic diffuser is mounted on top of the tunnel, a ground glass plate covering the bottom of the tunnel through which the primary light energy is injected from a single lamp. The efficiency, while not high in either of the above-alluded to types nonetheless is about equal for each type. Accordingly, prior art arrangements still leave a lot to be desired as far as an enhanced efficiency is concerned.

SUMMARY OF THE INVENTION

Accordingly, an important object of the present invention is to provide an illuminating system for multi-image printers that will surpass the efficiencies of prior art arrangements. In this regard, an aim of the invention is to reduce the exposure times required for illuminating systems used in multi-image printers by a factor of 2 to 4 or even more as far as prior art systems are concerned. While my invention permits the reduction in exposure times, as just pointed out, it can alternately be employed to reduce the primary lamp wattage, thereby minimizing the heat that must be dissipated. In either situation, that is, reducing the exposure times or reducing the heat to be dissipated, it should be apparent that a more efficient illuminating system is herein provided for use in conjunction with present-day multi-image printers.

A more specific object of the invention is to control the stream of light passing through the negative placed in a multi-image printer so that the beam is confined within predetermined boundaries covering only the area being occupied by the various objective lenses that have been inserted into the light stream at a given moment. It will be appreciated that the concentration of the light beam within useful boundaries, combined with the higher brightness produced by using a smaller emission opening, accounts for the greater efficiency of my invention. Stated somewhat differently, when practicing my invention all of the illumination from a light source is usefully employed in supplying a light stream having boundary rays that include therewithin all of the various objective lenses that are mounted on a complete set of lens boards and which lens boards are successively inserted into the light stream defined by the appropriately provided boundary rays.

Briefly, my invention contemplates the concentrating of light energy provided from one or more lamps to form a secondary light source of small or restricted area. It is the light from the secondary source that is then passed through an optical system comprised of various lenses designed to magnify the relatively small area source to form an enlarged area of illumination sufficient in size to cover a photographic negative several times larger than the secondary light source but nonetheless covering a sufficient area so as to provide uniform light to whatever number of objective lenses are in the printing field at a given time.

BRIEF DESCRIPTION OF THE DRAWINGS

FIG. 1 is a greatly simplified, somewhat diagrammatic, view of a typical mult-image printer;

FIG. 3 is a schematic diagram depicting my invention with a number of objective lenses shown, even though in actual practice only a single array of such lenses would be in position at any given time;

FIG. 4 is a top plan view of a lens board constituting a 4-up objective lens array;

FIG. 5 is a front elevational view corresponding to FIG. 4;

FIG. 6 is a cross sectional view taken in the direction of line 6—6 of FIG. 4 for the purpose of illustrating the construction of a lens unit.

DESCRIPTION OF THE PREFERRED EMBODIMENTS

Figure 2:
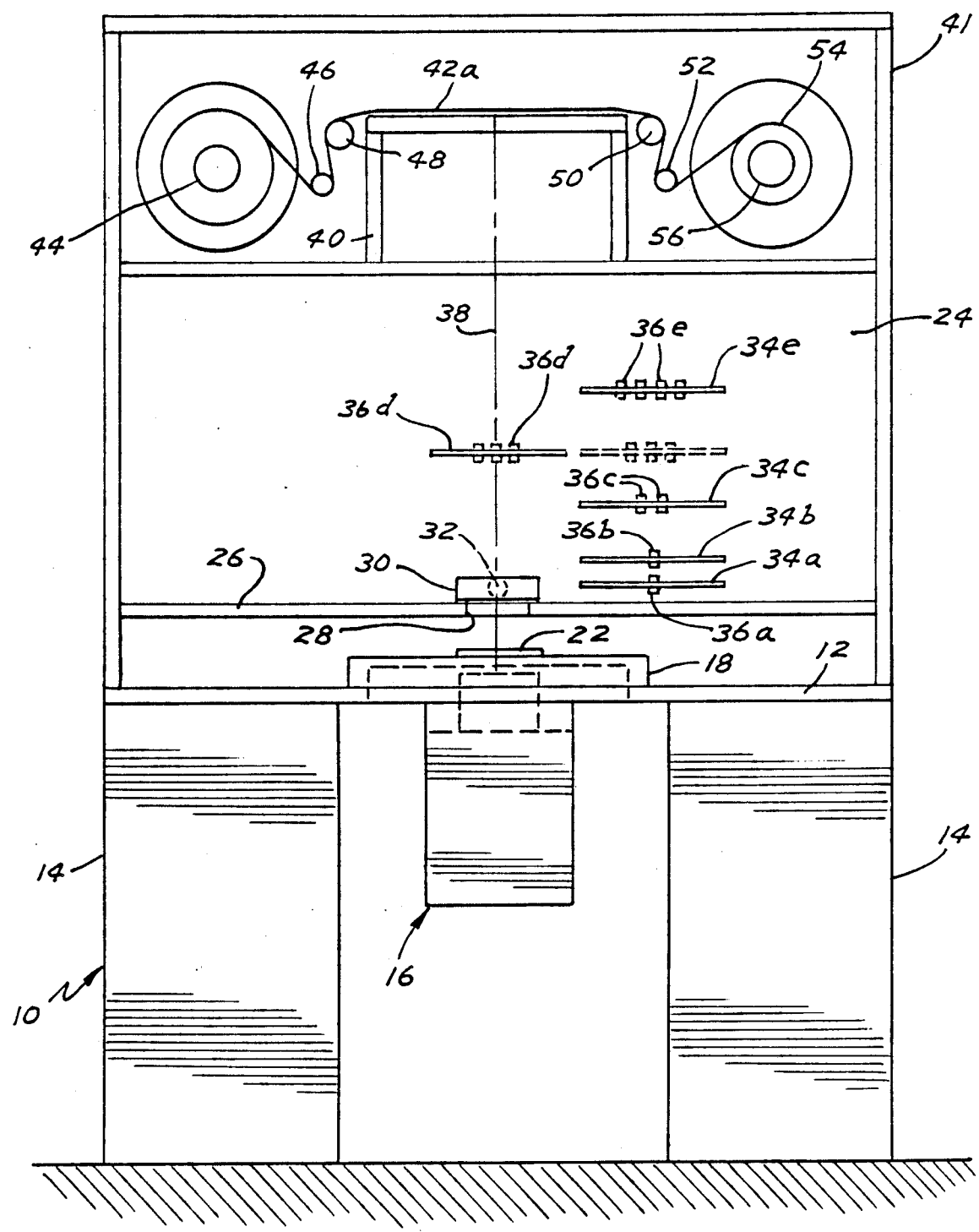
FIG. 2 is a plan view of a strip of prints produced by the multi-image printer of FIG. 1.

In order to assure a complete understanding of the benefits to be derived from a practicing of my invention, it will be well to preface a detailed description thereof by first referring to FIG. 1 where a typical multi-image printer has been denoted generally by the reference numeral 10. The printer 10 includes a table 12 supported on two pedestals 14. Suspended beneath the table 12 is a light supply unit 16 which will be referred to in greater detail hereinafter. Supported on the table 12 is a negative holder 18. Reference should perhaps be made at this stage to FIG. 3 where the negative holder 18 also appears more diagrammatically and where it can be seen that the holder 18 has a negative aperture 20 and also for the sake of completion a negative 22 is shown resting on the negative holder 18.

Surmounted above the negative holder 18 in FIG. 1 is a lens chamber 24, having a bottom wall 26 provided with an opening or aperture 28. A reciprocable shutter 30 operated by an air cylindar 32 (appearing in phantom outline) blocks the aperture except when a print is being made.

The chamber 24 contains a number of lens boards 34a, 34b, 34c, 34d and 34e, each having a different array of objective lenses 36a, 36b, 36c, 36d and 36e mounted thereon as is conventional. The boards 34a, 34b, 34c, 34d and 34e are normally stored at rest in the right side of the chamber 24, as illustrated. It will be appreciated that any selected board 34a, 34b, 34c, 34d or 34e may be manually, but usually automatically, moved into operating position, then being centered on the vertical centerline or axis 38. As an example, the lens board 34d has been moved from its phantom or stored position at the right to the solid line or exposure position on the centerline or axis 38.

Continuing with the description of the multi-image printer 10, it can be pointed out that such a printer includes a print box 40. Associated with the print box 40 is a paper cabinet 41 containing therein a roll 42 of unexposed photographic paper, the roll 42 being supported on a rotatable spindle 44. The paper from the roll 42 is threaded past rollers 46, 48 over the print box 40, past rollers 50, 52 and then onto a take-up roll 54 mounted for rotation on a spindle 56. It will be understood that the sensitized paper supplied from the roll 42 when positioned over the print box 40 constitutes the portion of the paper that is printed with whatever array of images is produced by the particular lens board 34a, 34b, 34c, 34d or 34e that is at any one time in the light path. In FIG. 1, the lens board 34d has been so positioned. Therefore, this segment of sensitized paper 42 has been given the reference numeral 42a, but it will be understood that it is advanced in the direction of the take-up roll 54 after each printing step has been completed. In other words, during the operation of the printer 10, various lens boards 34 are moved, one at a time, onto the optical centerline 38 and one or more exposures made. Each exposure is controlled by the shutter 30. The exposure includes the paper section labelled 42a. However, after each exposure, the now exposed paper, which has been referred to by the numeral 42a is advanced while the next lens board 34 and the lens array 36 mounted thereon is exchanged or substituted for the previous one.

Directly under the negative holder 18 is the light supply unit 16 providing light energy for the purpose of photographically exposing the sensitized material or paper fed from the roll 42. Conventionally, the unit 16 would constitute a lamphouse, a number of which are currently available. However, my invention is concerned with an illumination system that for all intents and purposes replaces the usual lamphouse, all in a manner presently to be made manifest.

To further present a background picture of the prior art, attention is directed to FIG. 2 in which a strip 60 having a number of photographic prints thereon which are the product of the multi-image printer 10. This so-called package of prints includes an 11×14 print 62a, prepared from the single objective lens 36a mounted on the lens board 34a, an 8×10 print 62b, prepared from the single objective lens 36b mounted on the lens board 34b, a block of four 3½×5 prints 62c, prepared from the four objective lenses 36c carried on the lens board 34c, and nine 2½×3½ wallet-size prints 62d made from the nine objective lenses 36d carried on the lens board 34d. The lens board 34e has sixteen objective lenses 36e mounted thereon; the prints made from this array of lenses 36e are not shown on the strip 60 because of their diminutive size. Consequently, the shape of the light stream in the vicinity of the negative 22 which produces the various prints 62a, 62b, 62c and 62d must be square. Each strip 60 of prints, it will be understood, is produced with a single exposure from a particular lens array 36a, 36b, 36c, 36d (and 36e) mounted on a given or selected lens board 34. From the information that has been given, it will be recognized that such arrays of prints vary from what is produced by either the single lens 36a or 36b, the array of four lenses 36c, the array involving nine lenses 36d and the array involving sixteen lenses 36e (even though such prints do not appear on the strip 60). A variety of other print arrays are frequently desired, but what has been given should be sufficient as far as understanding my invention.

Turning now to a discussion of FIG. 3, it should be understood that FIG. 3 is a schematic diagram illustrating my invention in relation to the various objective lenses 36a–36e, all occupying their locations when successively positioned in the light path, that is with respect to the axis 38. However, FIG. 3 is really a hybrid figure in that the various lenses 36 would not be all in the light path at one time, in practice there being only a single array 36a, 36b, 36c, 36d in the light stream at any given moment. Nonetheless, FIG. 3 serves the purpose of more dramatically presenting an arrangement that can be considered in understanding my invention yet to be described. What should be appreciated from FIG. 3 is that the entrance pupil of every objective lens 36 be filled with light regardless of its location. More specifically, the single lens 36a that produces the print 62a in practice is spaced from the negative 22 a distance of between 2⅜ and 5 inches, depending upon the size of the negative 22.

From the foregoing it can be appreciated that the basic illumination requirement can be described as having every lens 36, when in its operative position, look at the negative 22 in a way such that the entire negative 22 is illuminated.

It may be helpful at this stage, even though conventional, to describe one of the lenses 36c mounted on the lens board 34c. With this in mind, attention is directed to FIG. 6 where the cross sectional make-up of one of the four objective lenses of FIG. 5 is depicted. The lens 36c in FIG. 6 includes a barrel 63 containing three optical glass elements 64, 66 and 68 separated by spacers 70 and 72, there being a fixed stop at 74. Also, there is a retaining ring 76 at the bottom of the lens 26c and a retaining ring 78 at the top.

Referring again to FIG. 3, it can be pointed out that in a test printer, the most distant array 36e was located 14.085 inches from the 46 mm negative 22, whereas the closest single lens 36a was situated 3.877 inches from the 46 mm negative 22. Of all of the individual objective lenses 36, only three were approximately on the optical centerline 38, these being the two single objective lenses 36a and 36b and the central component of the 9-up array 36d.

Nonetheless, since the four corners of the negative 22 are the points farthermost from the optical centerline 38, this condition represents the worst case situation. Therefore, it will be appreciated that FIG. 3 is taken on the diagonal line 5—5 of FIG. 4, the diagonal line 5—5, in effect passing through the center of the negative aperture 20.

The magnification system has been denoted generally by the reference numeral 80 and comprises individual lenses 82, 84, 86 and 88. It will be helpful to show the boundary rays which will usefully illuminate the lens field and which pass through one corner of the negative aperture 20. With this in mind, these rays have been given the reference numerals 90a, 90b, 90c and 90d. Due to the rotational symmetry of the optics, these arays 90a, 90b, 90c and 90d are valid for the other three corners of the negative aperture 20. It follows that when this worse case is satisfied, then the rest of the negative aperture 20, and of course the negative 22, is satisfactorily illuminated throughout.

Figure 7:
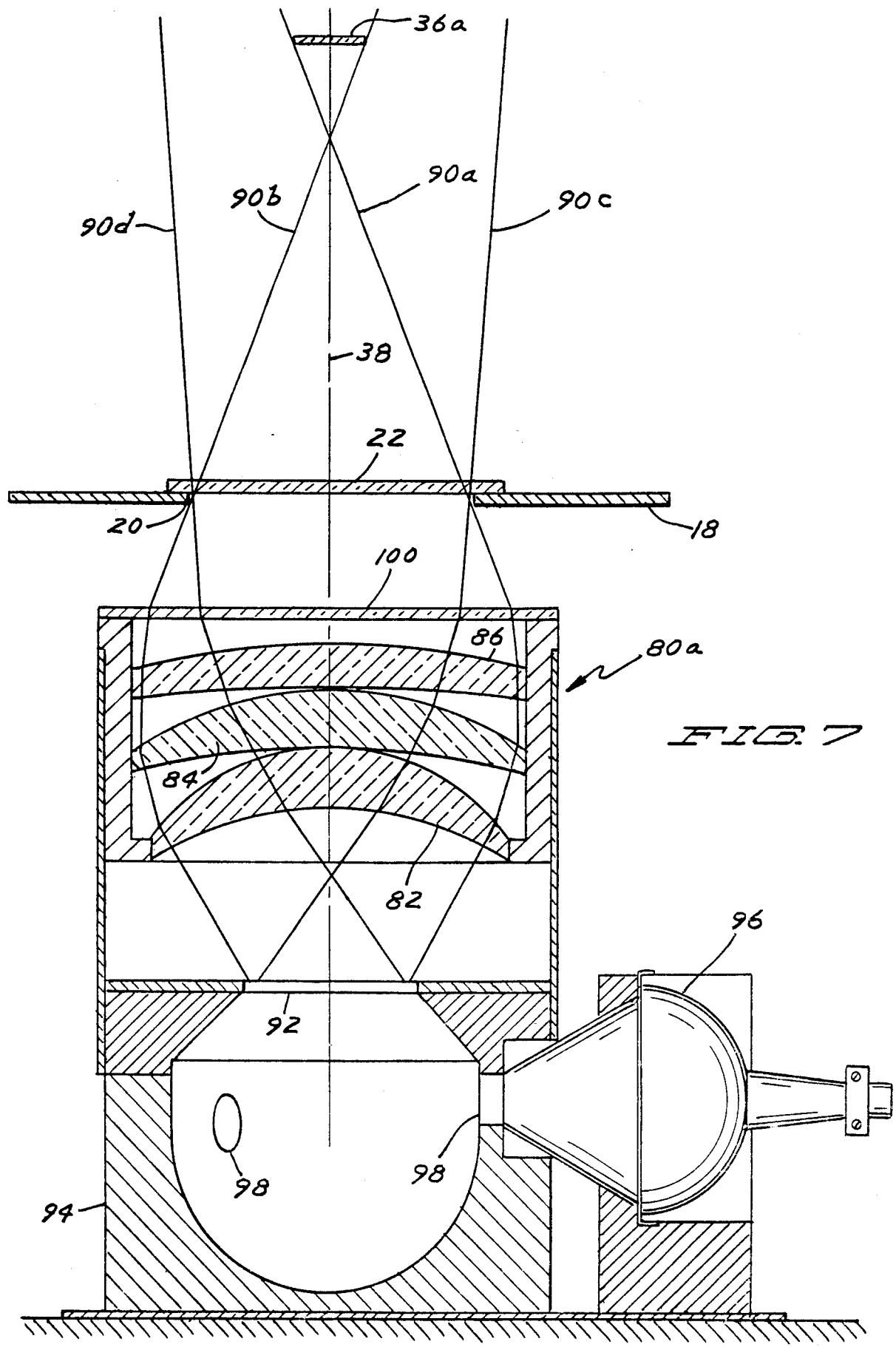
FIG. 7 is a schematic diagram constituting another embodiment that my invention may assume the view cross sectionally illustrating the light chamber located therebeneath.

The rays 90a, 90b, 90c and 90d originate at the small emission opening 92 belonging to an integrating chamber 94 shown more fully in FIG. 7. The more complete integrating chamber 94 of FIG. 7 makes use of three 75 watt reflector lamps 96, only one of which appears in FIG. 7, that were subjected to a voltage considerably below their rated voltage, the light entering the chamber 94 via a port 98. A second port 98 appears in FIG. 7, although the lamp 96 associated therewith cannot be seen. Other structures can be employed as long as they provide a similar area of diffused light with respect to the relatively small emission opening 92. It can be explained that in the test printer, the emission opening 92 was on the order of about one inch square, only one-quarter of the area forming the opening 92 being required when the magnification system 80 is placed relatively close to the negative aperture 20.

As can be appreciated from FIG. 3, the light energy is directed through a solid angle defined by the limits of the boundary rays 90a, 90b, 90c and and 90d. It is important to recognize that the combination of the brighter source provided at the emission opening 92, along with the more restricted solid angle of the light leaving the magnifying system 80 results in a vast improvement in efficiency, which can be used either to obtain a shorter exposure, or reduced lamp wattage, or both.

It has been found that the magnifying optical system 80 must be of short focus compared to its required diameter. A two-inch focal length is acceptable for the 46 mm negative size, this being the size of the negative 22 that has been selected as an example. Because of this extreme ratio, the system 80 is constructed of the multiple elements indicated by the reference numerals 82, 84, 86 and 88. The three elements 82, 84 and 86 have a diameter of 3.5 inches, whereas the remaining element 88 has a diameter of 3.2 inches.

Establishing the angles of the boundary rays 90a, 90b, 90c and 90d and the points where these rays intercept the optical axis 38 is simply matter of geometry for a given printer 10 and whatever lens arrays 36 it contains. Thus, it will be seen that the required size of the emission opening 92, which serves as a secondary light source, is minimum when placed at the point along the optical axis 38 where these rays 90a, 90b, 90c and 90d are equidistant from the optical axis 38.

Whereas in FIG. 3, the element 88 can be said to be the first element and the element 82 which is closest to the integrating sphere 94 as the final element, it should be pointed out that the first element 88 in the system of FIG. 3 can be replaced with a plastic fresnel lens 100 as long as it is placed somewhat farther from the negative 22. The modified system is illustrated in FIG. 7 and has been labeled 80a.

It will be appreciated that the larger prints made by multi-image printers tend to suffer from a deficiency of illumination in the corners, and since my invention supplies much greater illumination than available heretofore, it is feasible to slightly decrease the intensity in the center, and consequently balance out this effect. This is easily done by using a film transparency having a slight density in the center, graduated to clear film at the edges. Alternately, a thin, clear plastic film, having a finely ground diffusing area in the center, can be employed. Either of these alternatives can be inserted between any two of the lenses 82, 84, 86 and 88 in the optical system 80. On the other hand, the center of one of the elements 82, 84, 86 and 88 can be polished out completely at its edges, and a diffused center produced by a finishing emery stage. This forms a graduated transition between these two types of surfaces.

It will be recognized that my invention can be used with recognized, photographic methods. For instance, the so-called subtractive system can be readily performed by introducing color-correcting filters at any convenient point along the optical path between the diffused light source provided by the emission opening 92 and the early-mentioned sensitized paper supplied by the roll 42. Another widely used method with which my invention may be employed involves the use of sharp cut-off filters so as to selectively terminate the individual components by introducing such filters via solenoid actuation during a white light exposure. The best location for these components is just above the secondary light source provided by the emission opening 92. Still another exposing system is the so-called additive system which can be applied by utilizing a light source produced by multiple lamps, each lamp being filtered in order to transmit a single color. Actually, the above procedures are all well-known in the photographic processing industry, so a detailed description thereof need not be supplied, although it is important to recognize that my invention is susceptible to being used with various photographic processing techniques.

In the earlier part of the description, reference was made to the light supply unit 16. It should now be apparent that such unit 16 provides an enclosure for the magnifying system 80 of FIG. 3 or the slightly modified system 80a of FIG. 7, along with the integrating chamber 94 best seen in FIG. 7.

I claim:

1. A multi-image photographic printer comprising supporting means for light sensitive print material, a plurality of lens arrays providing an objective lens field, a negative holder having an aperture therein, means for providing a source of diffused light substantially less in size than said negative aperture, and a magnifying optical system disposed between said light source and said negative aperture providing illumination sufficient to only fill said negative aperture and to provide a light stream having boundary rays covering said objective field to provide uniform light to whichever one of said plurality of lens arrays is in said objective field.

2. A multi-image photographic printer in accordance with claim 1 in which said magnifying optical system includes a number of positive lens elements.

3. A multi-image photographic printer in accordance with claim 1 in which said light providing means includes a light integrating chamber having an emission opening associated therewith, said emission opening being substantially smaller in size than said negative aperture.

4. A multi-image photographic printer in accordance with claim 3 in which the boundary rays of said objective lens field are refracted by said magnifying optical system and originate within the area of said emission opening.

5. A multi-image photographic printer in accordance with claim 4 in which said boundary rays originate at opposite sides of said emission opening.

6. A multi-image photographic printer in accordance with claim 5 in which said magnifying optical system has an optical centerline which extends through said emission opening, said boundary rays originating at equal distances with respect to said optical centerline.

7. A multi-image photographic printer in accordance with claim 6 including a shutter for intersecting said centerline for controlling an exposure cycle.

8. A multi-image photographic printer comprising supporting means for light sensitized print material spaced therefrom, a negative holder having an aperture therein, a plurality of lens arrays located between said material and said negative holder providing an objective lens field, a shutter, a light-excluding enclosure adapted to protect the light sensitized material when said shutter is closed, means for providing a source of diffused light substantially less in size than said negative aperture, and a magnifying optical system for providing illumination sufficient to only fill said negative aperture and to provide a light stream having boundary rays covering said objective field to provide uniform light to whichever one of said plurality of lens arrays is in objective field.

9. A negative illuminating system in combination with a multi-image photographic printer equipped with a plurality of lens arrays, each lens array including at least one objective lens, and a negative holder with an aperture therein, the illuminating system comprising a light source of limited area, an optical system for enlarging the light from said limited area light source in the vicinity of said negative holder to provide a stream of uniform light, said optical system transmitting its energy in the form of said uniform light stream substantially restricted to the operating field of the various objective lenses contained in said plurality of lens arrays.

10. A method of producing multiple image prints from a negative via a plurality of lens arrays providing an objective lens field, the method comprising the steps of providing a source of uniform illumination having an area less than that of the negative, and optically enlarging the area of said uniform illumination source to substantially that of said negative and concomitantly confining light to a region within said objective lens field.

* * * * *